(12) United States Patent
Perlmutter et al.

(10) Patent No.: US 7,280,707 B2
(45) Date of Patent: Oct. 9, 2007

(54) REGISTRATION OF SEPARATIONS

(75) Inventors: Keren O. Perlmutter, Pacific Palisades, CA (US); Sharon M. Perlmutter, Pacific Palisades, CA (US); Eric Wang, Tustin, CA (US); Paul R. Klamer, La Canada, CA (US); Leng Chua, Alhambra, CA (US); Christopher J. Cookson, Studio City, CA (US); Massimiliano Gasparri, Los Angeles, CA (US)

(73) Assignees: AOL LLC, Dulles, VA (US); Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 11/341,461

(22) Filed: Jan. 30, 2006

(65) Prior Publication Data
US 2006/0120626 A1 Jun. 8, 2006

Related U.S. Application Data

(60) Division of application No. 10/933,509, filed on Sep. 3, 2004, now Pat. No. 7,127,125, which is a continuation-in-part of application No. 10/035,337, filed on Jan. 4, 2002, now Pat. No. 7,092,584.

(60) Provisional application No. 60/500,371, filed on Sep. 5, 2003.

(51) Int. Cl.
*G06K 9/32* (2006.01)
(52) U.S. Cl. ............... 382/294; 382/165; 382/209; 382/284; 358/518; 358/540; 358/450
(58) Field of Classification Search ........... 382/274, 382/275, 284, 294, 165, 209; 358/3.27, 450, 358/518, 540
See application file for complete search history.

(56) References Cited

U.S. PATENT DOCUMENTS

| 4,167,678 | A | * | 9/1979 | Mischo et al. ......... 250/559.36 |
| 4,285,004 | A | | 8/1981 | Morrison et al. |
| 4,320,414 | A | | 3/1982 | Miyaji et al. |
| 4,547,050 | A | * | 10/1985 | Collender .................... 352/43 |
| 4,641,244 | A | | 2/1987 | Wilson et al. |

(Continued)

OTHER PUBLICATIONS

Boult, T.E., and Wolberg, G., "Correcting Chromatic Aberrations Using Image Warping," *Proceedings of DARPA92*, pp. 363-377, 1992.*

(Continued)

*Primary Examiner*—Yosef Kassa
(74) *Attorney, Agent, or Firm*—Fish & Richardson P.C.

(57) ABSTRACT

Images may be registered using temporal (time-based) and spatial information. In a film implementation, because film is a sequence of frames, using information from neighboring frames may enable a temporally smoother visual experience. In addition, it may be beneficial to take advantage of the fact that consecutive frames are often shifted similarly during the photographic process. Distortion measures may be used that discount candidate transformations that are considered to be too far from one or more preferred transformations, such as, for example, an optimal transformation from another frame or block or a currently-optimal transformation from the same frame/block. Composite color images may be processed to provide registration of underlying components.

20 Claims, 7 Drawing Sheets
(2 of 7 Drawing Sheet(s) Filed in Color)

U.S. PATENT DOCUMENTS

| | | | |
|---|---|---|---|
| 4,849,914 A | | 7/1989 | Medioni et al. |
| 4,890,160 A | | 12/1989 | Thomas |
| 5,022,089 A | | 6/1991 | Wilson |
| 5,023,815 A | | 6/1991 | Wilson et al. |
| 5,315,413 A | | 5/1994 | Yamamoto et al. |
| 5,321,515 A | * | 6/1994 | Kusaka et al. ............ 348/208.6 |
| 5,325,190 A | | 6/1994 | Nagasaki et al. |
| 5,345,316 A | * | 9/1994 | Ozaki et al. ................. 382/234 |
| 5,418,574 A | | 5/1995 | Miyabata et al. |
| 5,475,428 A | | 12/1995 | Hintz et al. |
| 5,576,738 A | * | 11/1996 | Anwyl et al. ................ 345/212 |
| 5,608,864 A | * | 3/1997 | Bindlish et al. ............ 345/558 |
| 5,640,200 A | | 6/1997 | Michael |
| 5,917,987 A | | 6/1999 | Neyman |
| 5,956,453 A | * | 9/1999 | Yaegashi et al. .............. 386/52 |
| 6,002,434 A | | 12/1999 | Topper |
| 6,075,905 A | | 6/2000 | Herman et al. |
| 6,266,452 B1 | | 7/2001 | McGuire |
| 6,295,083 B1 | | 9/2001 | Kuhn |
| 6,323,934 B1 | | 11/2001 | Enomoto |
| 6,345,130 B1 | * | 2/2002 | Dahl .......................... 382/286 |
| 6,373,970 B1 | | 4/2002 | Dong et al. |
| 6,414,693 B1 | * | 7/2002 | Berger et al. ................ 345/641 |
| 6,427,020 B1 | * | 7/2002 | Rhoads ....................... 382/100 |
| 6,503,201 B1 | * | 1/2003 | Liu et al. .................... 600/443 |
| 6,611,598 B1 | * | 8/2003 | Hayosh ....................... 380/54 |
| 6,870,564 B1 | | 3/2005 | Burns |
| 2001/0030697 A1 | | 10/2001 | Dischert et al. |

OTHER PUBLICATIONS

Brown, Lisa G., "A Survey of Image Registration Techniques," *ACM Computing Surveys,* vol. 24, No. 4, pp. 325-376, 1992.*

Li, H., et al., "A Contour-Based Approach to Multisensor Image Registration," *IEEE Transactions on Image Processing,* vol. 4, No. 3, Mar. 1995, pp. 320-334.*

Canny, John, "A Computational Approach to Edge Detection," *IEEE Tranactions on Pattern Analysis and Machine Intelligence,* vol. PAMI-8, No. 6, Nov. 1986, pp. 679-698.*

Srinivasan, S., et al., "*mist*: Multispectral Image Similarity Transformation," *LNK Home Page,* pp. 1-20, printed Dec. 12, 2001.*

"The Wide Screen Time Machine: Mechanix Illustrated Mar. 1939, How the Technicolor Camera Works," reprinted from http://www.widescreenmuseum.com/widescreen/mi-techcamera.htm, on Dec. 18, 2002, 3 pages.*

"Technicolor," reprinted from http://www.everything2.com/index.pl?node=Technicolor, on Dec. 18, 2002, 3 pages.*

Ball, J.A., "The Technicolor Process of Three-Color Cinematography," *Journal of Motion Picture Engineers,* vol. XXV, No. 2, Aug. 1935, pp. 127-138.*

* cited by examiner

REGISTRATION OF SEPARATIONS

CROSS-REFERENCE TO RELATED APPLICATIONS

This application claims priority from and is a divisional of U.S. application Ser. No. 10/933,509, filed Sep. 3, 2004 now U.S. Pat. No. 7,127,125, and titled REGISTRATION OF SEPARATIONS, which is continuation-in-part of U.S. application Ser. No. 10/035,337, filed Jan. 4, 2002 now U.S. Pat. No. 7,092,584, and titled REGISTRATION OF SEPARATIONS, which claims priority from U.S. provisional Application No. 60/500,371, filed Sep. 5, 2003, and titled REGISTRATION OF SEPARATIONS, all of which are incorporated herein by reference in their entirety.

TECHNICAL FIELD

This invention relates to image processing, and more particularly to the registration of separations.

BACKGROUND

Color motion picture film is a relatively recent development. Before the advent of color film stock in the 1950s, a process for making color motion pictures included capturing color information on two or more reels of black and white film. In the original Technicolor three color film separation process, three reels of black and white film were loaded into a specially-designed movie camera. The light coming through the lens was split into the three primary colors of light and each was recorded on a separate reel of black and white film. After developing the three reels, three photographic negatives representing the yellow (inverted blue), the cyan (inverted red), and the magenta (inverted green) portion of the original reels were created.

In addition to the creation of color separations through the original Technicolor process, color separations also have been produced and used for the archival of color film because black and white film stock generally has a much greater shelf-life than color film. In this process, the color film stock is used to expose one reel of black and white film with sequential records of red, green, and blue so that each frame is printed three times on the resultant reel to form a sequential separation.

Film studios may recombine the three color separations onto a single reel of color film using a photographic process that is performed in a film laboratory. In the case of three color separations that are each located on a separate reel, an optical film printer is employed to resize and reposition each source reel, one at a time. In particular, three passes are made. First, the magenta source reel is projected through an appropriate color filter onto the destination reel. Thereafter, the destination reel is rewound, the next source reel is loaded and resized, and the color filter is changed. For this reel, a human operator determines a global alignment (and scaling if necessary) for the entire set of frames within the reel or, alternatively, within selected scenes on a scene-by-scene basis, with each scene including several, if not hundreds, of frames. However, because of the human intervention required, the alignment often is not determined on a frame-by-frame basis for the entire reel. The process is repeated until all three color separations have been printed on the single destination reel using the optical film printer. The resulting destination reel is called an interpositive ("IP"), and the colors are now represented as red, green, and blue (as opposed to cyan, magenta, and yellow).

SUMMARY

In one general aspect, automatically registering digital images includes accessing first and second digital images, and a first transformation. The first image includes first content for a feature in a first frame, and the second image includes second content for the feature. The first transformation has been determined between at least an aspect of a third digital image and a corresponding aspect of a fourth digital image, with the third and fourth digital images including content for the feature in a second frame. The first frame represents the feature at a first point in time, and the second frame represents the feature at a time that either precedes or succeeds the first point in time. A second transformation is automatically determined based on the first transformation, and the second transformation reduces a misregistration between at least an aspect of the first digital image and a corresponding aspect of the second digital image. The second transformation is automatically applied to the first digital image to reduce the misregistration between at least the aspect of the first digital image and the corresponding aspect of the second digital image.

Determining the second transformation also may be based on the first content and the second content. Determining the second transformation may include determining a candidate transformation based only on content from the first frame, and biasing toward either the first transformation or toward the candidate transformation. The first transformation may include a first translation. The candidate transformation may include a second translation. Determining the second transformation may include determining a distance between the first translation and the second translation. Biasing may include comparing the distance to a threshold, and setting the second transformation equal to the first transformation based on the results of the comparison of the distance to the threshold.

Determining the second transformation may include accessing a target image that is based on one or more of the first and second digital images. A first transformation may be applied to the target image to obtain a first transformed target image. A first distortion may be determined based on the first transformed target image. The candidate transformation may be applied to the target image to obtain a second transformed target image. A candidate distortion may be determined based on the second transformed target image. Biasing may include computing a product of the candidate distortion and a threshold, and comparing the product to the first distortion. The second transformation may be set equal to the first transformation based on results of the comparison of the product to the first distortion.

The second transformation may include a translation, and the translation may include a multi-dimensional vector. The second frame may immediately precede the first frame in a film, or the second frame may immediately follow the first frame in a film.

Multiple transformations, including the first transformation, may be accessed. The multiple transformations each may relate to at least one of multiple frames that are distinct from the first frame. Determining the second transformation may be further based on each of the multiple transformations. An initial transformation may be accessed, in which the initial transformation reduces the misregistration between the first digital image and the second digital image. Determining the second transformation may be further based on the initial transformation. Determining the second transformation may include determining a most common element, an average, or a median of a set that includes the multiple transformations and the initial transformation.

The multiple transformations may include (i) a previous-frame transformation that relates to a previous frame that precedes the first frame, and (ii) a successive-frame transformation that relates to a successive frame that succeeds the first frame. Determining the second transformation may include (i) determining a previous sign change between the previous-frame transformation and the initial transformation, (ii) determining a successive sign change between the successive-frame transformation and the initial transformation, and (iii) smoothing the initial transformation based on the previous sign change and the successive sign change.

The first transformation may be determined. The second transformation may equal the first transformation.

The aspect of the first digital image may include an edge, subportion, or feature of the first digital image, and the corresponding aspect of the second digital image may include a corresponding edge, subportion, or feature of the second digital image. The aspect of the first digital image may include the first content for the feature, and the corresponding aspect of the second digital image may include the second content for the feature. The first content may include color information for the feature.

In another general aspect, an apparatus has stored thereon a result of applying the second transformation to the first digital image as recited in the above general aspect.

In another general aspect, automatically registering digital images includes accessing first and second digital images. The first image includes first content for a feature in a first frame, and the second image includes second content for the feature. A first candidate transformation is determined, the first candidate transformation reducing a misregistration between the first and second digital images. A second candidate transformation is accessed. A distance is determined between the first candidate transformation and the second candidate transformation. The distance is compared to a threshold. The first candidate transformation is discounted based on results of the comparison of the distance to the threshold. Whether to use the first candidate transformation as a final transformation is determined based on results of the discounting of the first candidate transformation.

A misregistration distortion resulting from application of the first candidate transformation to the first digital image may be determined. Determining whether to use the first candidate transformation as a final transformation may be further based on the misregistration distortion.

The first candidate transformation may include a first translation, and the second candidate transformation may include a second translation. The second candidate transformation may be determined. The determination of the second candidate transformation may be based only on content from the first frame. The first candidate transformation may be determined based only on content from the first frame.

Determining the second candidate transformation may include accessing multiple candidate transformations. For each of the multiple candidate transformations, a distortion value may be determined that indicates a level of misregistration between the first and second digital images after applying one of the multiple candidate transformations. The distortion values for each of the multiple candidate transformations may be compared. One of the multiple candidate transformations may be selected as the second candidate transformation based on results of the comparison of the distortion values for each of the multiple candidate transformations.

The threshold may be a constant.

A third candidate transformation may be accessed. A first distance may be determined between the first candidate transformation and the third candidate transformation. A second distance may be determined between the second candidate transformation and the third candidate transformation. The first distance may be compared to the second distance. The first candidate transformation may be discounted based on results of the comparison of the first distance to the second distance.

The first and second digital images may be associated with a first block in the first frame. The third candidate transformation may be a transformation for reducing misregistration between a third digital image and a fourth digital image that are associated with a second block in the first frame.

A series of additional first candidate transformations may be determined after determining the first candidate transformation. The first of the additional first candidate transformations may be, for example, no closer to the third candidate transformation than is the first candidate transformation. Each of the remaining additional first candidate transformations may be, for example, no closer to the third candidate transformation than is the previous additional first candidate transformation in the series.

The first and second digital images may be associated with a first block in the first frame. Determining the second candidate transformation may include selecting as the second candidate transformation a candidate transformation for reducing misregistration between a third digital image and a fourth digital image that are associated with a second block in the first frame.

Accessing the first digital image may include accessing a portion of a first edge map, the first edge map corresponding to a first color separation of the first frame. Accessing the second digital image may include accessing a portion of a second edge map, the second edge map corresponding to a second color separation of the first frame. The first content may include edge information in the first edge map, and the second content may include edge information in the second edge map.

A third candidate transformation may be determined. The threshold may be a function of distance between the second candidate transformation and the third candidate transformation.

The second candidate transformation may be determined, based only on content from a second frame, to reduce a misregistration between a third digital image and a fourth digital image. Each of the third and fourth digital images may include content for the feature in the second frame. The first frame may represent the feature at a first point in time, and the second frame may represent the feature at a time that either precedes or succeeds the first point in time.

The threshold may be a distance between the second candidate transformation and a third candidate transformation. The third candidate transformation may be a candidate transformation to reduce misregistration between the first and second digital images. Discounting may include adding an additional distortion term to the misregistration distortion.

In another general aspect, automatically registering digital images includes accessing a composite color image and automatically separating from the composite color image first and second component digital images. The first component digital image includes first content for a feature in a first frame. The second component digital image includes second content for the feature in the first frame. A transformation is automatically determined for the first component digital image to reduce a misregistration between at least an aspect of the first and second digital component images. The transformation is automatically applied to the first component digital image to reduce the misregistration and to produce a transformed first component digital image. A new composite color image is formed using the transformed first component digital image and the second component digital image.

The composite color image may be configured according to a video format, and separating the first and second component digital images may include converting the composite color image into an RGB format with the first and second component digital images each corresponding to separate color components of the RGB format. Forming the new composite color image may include converting the transformed first component digital image and the second component digital image from the RGB format into the video format.

In another general aspect, an apparatus has stored thereon the new composite color image of the above general aspect.

In another general aspect, registering frames includes accessing a first frame and a second frame that are successive frames. A resultant transformation is automatically determined for registering at least part of the second frame based on content in the first frame and on content in the second frame.

Determining the resultant transformation may include determining a first transformation for at least part of the first frame based on content of the first frame. An initial transformation may be determined for at least a corresponding part of the second frame based on content of the second frame. The resultant transformation may be determined based on the first transformation and the initial transformation. The resultant transformation may be applied to at least part of the second frame to produce a transformed part.

In another general aspect, an apparatus has stored thereon the above transformed part.

In another general aspect, an apparatus stores information relating to an image in a sequence of images. The information is configured to allow generation of a first component image of the image and a second component image of the image, and the first and second component images include first and second content, respectively, that relates to a specific portion of the image. The second component image has been transformed to reduce misregistration between the first and second component images as compared to misregistration between the first component image and a prior version of the second component image. The transformation is based on registration information from another image in the sequence of images.

The second component image may include analog information or digital information or both. The first and second component images may each include a color separation, displays of which are configured to collectively form at least part of a single resultant image. One or more of the color separations may be a digital color separation. The second component image may be part of a frame in a film. The apparatus may include a reel, a video, an optical disc, or a computer readable medium.

The second component image may have been indirectly transformed by being based on one or more images that have been directly transformed. The second component image may be one of a set of corresponding images stored in a YUV format. The set of corresponding images, including the second component image, may be based on another set of corresponding images having an RGB format. One or more of the other set of corresponding images may have been directly transformed to reduce misregistration between two or more images of the other set of corresponding images, whereby the second component image is indirectly transformed by being based on the one or more images that have been directly transformed.

The information may include encoded information configured to be decoded to generate the first and second component images. The first and second component images may be interleaved with each other.

A computer program may be stored on a computer-readable medium and may include instructions for causing a computer to perform one or more of the above general aspects and, if desired, one or more of the additional features. An apparatus may include one or more processors programmed to perform one or more of the above general aspects and, if desired, one or more of the additional features. An apparatus may include a result of a process applying one or more of the above general aspects or variations of these aspects.

Various general aspects address methods for the registration of separations or images that may correspond to separations. The separation may relate to film or other fields. Such methods may include one or more of a variety of features, such as, for example: (1) accessing a composite color image or a component image (also referred to as a separation) relating, for example, to one or more colors or luminance; (2) accessing component images that are based on a variety of separations, including, for example, digitized film separations for which each of the component images includes a set of gray-level pixels; (3) correcting one or more film distortions; (4) automatically determining a transformation to reduce a film distortion; (5) enhancing spatial continuity within a frame; (6) enhancing temporal continuity across consecutive frames; (7) applying multiple criteria of merit to a set of features to determine a set of features to use in determining a transformation; (8) determining transformations for areas in an image or a separation in a radial order; (9) comparing areas in images or separations by weighting feature pixels differently than non-feature pixels; (10) determining distortion values for transformations by applying a partial distortion measure and/or using a spiral search configuration; (11) determining distortion values based on transformations of neighboring or consecutive portions of a frame; (12) determining transformations by using different sets of features to determine corresponding transformation parameters in an iterative manner; and (13) applying a feathering technique to neighboring areas within an image or separation.

The described implementations may achieve, one or more of the following features. For example, they may provide an automatic and efficient digital image registration process for color film separations. The process may operate in the digital domain to enable the use of a number of digital image processing techniques, and may require minimal human intervention. The process may be computationally efficient, and may be capable of determining alignments on a frame-by-frame basis. The process also may address the local nature of the misregistration within an image that results from such causes as film shrinkage due to aging. In addition, the process may compensate, correct, or avoid one or more of the described distortions.

One or more implementations are set forth in the accompanying drawings and the description below. Other implementations will be apparent from the description, drawings, and claims.

DESCRIPTION OF DRAWINGS

The patent or application file contains at least one drawing executed in color. Copies of this patent or application publication with color drawing(s) will be provided by the Office upon request and payment of the necessary fee.

DETAILED DESCRIPTION

Figure 1:
FIG. 1 is a picture illustrating misregistration.

The film processes described earlier, as well as other processes, may be subject to one or more of a variety of well-known film distortions. These include static misregistration, dynamic misregistration, differential resolution, and loss of resolution. Although referred to as film distortions, these distortions also may be present in other applications and environments. For example, registration of separations may be required, and one or more film distortions may be present, in photography, astronomy, and medical applications.

Static misregistration may be experienced due to one or more of a variety of reasons, six examples of which follow. First, in order to prevent color fringing around objects, the three source separations should be aligned with each another. The original cameras typically were adjusted mechanically by a technician with a micrometer. The alignment results therefore often varied, usually from camera to camera, within a single movie title. Second, due to variations among film printers, the printers sometimes failed to hold each of the separations to the same tolerances. Third, differences between the camera and the printer may have caused color shifting. Fourth, the photographic compositing process discussed above typically operates on either a reel-by-reel basis or a scene-by-scene basis, rendering it difficult to correct misalignments that may occur on a frame-by-frame basis. Fifth, because the photographic compositing process provides a global alignment for a particular image, the process does not necessarily address the local misalignments that may occur within an image. Sixth, because film tends to shrink as it ages and the rate of shrinkage may vary per separation, color can fringe around the edges of an image even if the center of the image is perfectly registered.

Dynamic misregistration also may be experienced due to one or more of a variety of reasons, three examples of which follow. First, the film separations in a camera are subject to intermittent motion, stopping and starting, for example, twenty four times every second. All three separations must stop in precise alignment in order to obtain proper registration. However, such precise timing is difficult to achieve and maintain. Second, from frame-to-frame, the film may move in the camera or subsequent film printer leading to color fringing that moves in like manner. Third, film may be spliced together as part of a normal editing process, resulting in splices that are physically thicker than the film. When the splices pass over a roller in the photographic printing process, a small vertical bump in one or more color film separations may occur. As discussed above, because the photographic compositing process may not operate on a frame-by-frame basis, the process may not capture these types of misalignments.

Differential resolution also may arise due to one or more of a variety of reasons. For instance, the nature of the light path and lens coatings in the Technicolor cameras typically caused the three film separations to have drastically different resolution or sharpness. In particular, the cyan separation typically was located behind the yellow separation in what was known as a bipack arrangement. Light that passed through the yellow separation was filtered and unfortunately diffused before striking the cyan separation. As a result, the yellow (inverted blue) separation typically had a greater resolution compared to the cyan (inverted red) separation, and the magenta (inverted green) separation typically had a resolution that was similar to that of the yellow (inverted blue) separation. This difference in resolution may result in red fringing that encircles many objects.

Loss of resolution may arise, for example, from the use of an optical printer. Such a loss of resolution will affect all three separations. Thus, the resulting printer output can never be as sharp as the source.

Digital image registration can be used to address one or more of these film distortions. One aspect of digital image registration includes the process of aligning two or more digital images by applying a particular mapping between the images. Each digital image consists of an array of pixels having a dimensionality that may be quantified by multiplying the image width by the image height. Within the array, each pixel location $(x, y)$, $0<=x<=width$, $0<=y<=height$, has an associated gray-level value $I(x, y)$, where $0<=I(x, y)<=65,535$ (in the case of 16-bit data). The gray-level value $I(x, y)$ represents how much of the particular color (for example, red, green, or blue) is present at the corresponding pixel location $(x, y)$. If I1 represents a first image, I2 represents a second image, $I1(x, y)$ represents a pixel value at location $(x, y)$ within image I1, and $I2(x, y)$ represent a pixel value at location $(x, y)$ within image I2, the mapping between the two images can be expressed as:

$$I2(x, y) \text{ corresponds to } gI1(f(x, y)),$$

where f is a two dimensional spatial coordinate transformation that can be characterized by a pixel alignment vector, and g is an intensity transformation that, for example, can be characterized by an interpolation function. Note that g can also be the identity function $g(I1(f(x,y)))=I1(f(x,y))$, which may be used if, for example, no intensity transformation of I1 is intended. A registration algorithm may be used to find a spatial transformation or alignment vector, and in some cases, to find an intensity transformation, to match the images.

Figures 2, 3:
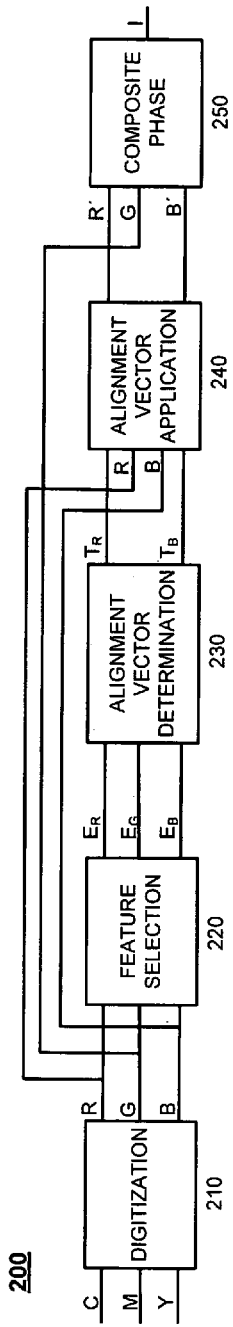
FIG. 2 is a block diagram of an implementation of a registration method.
FIG. 3 is a diagram of a partitioning of an image into blocks.

FIG. 1 illustrates one visual manifestation of misregistration that can occur due to one or more sources of distortion. One implementation for performing the registration in a way that reduces the misregistration leading to such distortion is illustrated in FIG. 2, which illustrates a system 200 including a digitization unit 210 that receives three separation images and outputs three digital, and possibly transformed, color component images. A feature selection unit 220 receives these digital images and, after processing, outputs them to an alignment vector determination unit 230. The alignment vector determination unit 230 determines transformations for two of the images against the third, with the third being used as a reference. In other implementations that employ other than three images, the alignment vector determination unit 230 would produce transformations for N−1 images, where N is the total number of images.

An alignment vector application unit 240 receives the two transformations from the alignment vector determination unit 230 and the two non-reference digital images from the digitization unit 210. The alignment vector application unit 240 modifies these two non-reference images using the transformations. Finally, a composite phase unit 250 combines the two modified images and the reference image into a composite image.

Digitization Unit

Multiple color separations are input into the digitization unit 210. In one implementation, the digitization unit 210 accepts multiple photographic negative images (for example, yellow, cyan, and magenta) and outputs multiple photographic positive images (for example, blue, red, and green) as digital data in the form of a set of gray-level pixels. Other implementations may perform one or more of a variety of other transformations, such as, for example, positive-to-negative, in lieu of or in addition to the negative-to-positive transformation; perform no transformation at all; or accept digitized data and thereby obviate the need for digitization.

Feature Selection Unit

Each of the digital color component images is input into the feature selection unit 220. Generally, the feature selection unit 220 selects a feature or feature set, such as, for example, one or more edges, objects, landmarks, locations, pixel intensities, or contours. In one implementation of the system 200, the feature selection unit 220 identifies a set of edges, optionally or selectively refines this set, and outputs an edge map (labeled $E_R$, $E_G$, or $E_B$) that may be in the form of an image consisting of edge and non-edge type pixels for each color component image.

An edge detection filter, for example, a Canny filter, may be incorporated in or accessed by the feature selection unit 220 and may be applied to a digital color component image in order to obtain a set of edges. The edge information may be combined or separated into, for example, orthogonal sets. One implementation obtains separate horizontal and vertical edge information.

After the edge detection filter has been applied and edge maps for the separate color component images are created, the edge maps can be further refined to attempt to identify a set of useful edges. In particular, the set of edges may be pruned to a smaller set so as to reduce the inclusion of edge pixels having properties that could cause misleading misregistration results. In one implementation, the feature selection unit 220 performs this pruning by applying one or more criteria of merit to each edge in order to determine whether that particular edge should be included or rejected. Thereafter, one or more second criteria of merit may be applied to the collection of included edges in order to determine whether the entire set should be retained or if the entire set should be rejected. If there are no acceptable refined edges after using one or more refinement techniques either individually or in combination, the alignment vector can be determined in some other manner, such as, for example, by applying the techniques discussed below with respect to the alignment vector determination unit 230.

Several techniques may be used to refine a set of edges by enforcing a minimum edge requirement and/or emphasizing high intensity areas as described below. Examples of these techniques include the use of horizontal/vertical information and the use of high intensity selection, both of which are discussed below.

Horizontal/Vertical Information

When searching for horizontal and vertical translational shifts, or more generally, alignments vectors, one implementation determines whether there is enough useful vertical and horizontal edge information within the area under consideration to make a useful alignment determination. For example, if there were only horizontal edges in an area (where the area could be of any size up to the full image size), it may not be beneficial to use these edges as features to determine a translational shift in the horizontal direction.

In order to determine the usefulness of certain edges, each edge is first compared to a criterion of merit that determines the vertical and horizontal extent of the edge in both absolute and relative (with respect to the other direction) terms. Thereafter, the set of edges that has been determined to have sufficient vertical or horizontal extent is compared to another criterion of merit in order to determine whether this new set should be retained or rejected in its entirety.

For instance, in one implementation, determining the sufficiency of vertical/horizontal edge information may include identifying a connected edge. For example, a connected edge may be identified by identifying a set of adjacent pixels that each have characteristics of an edge and that each have at least one neighbor pixel with characteristics of an edge.

For each connected edge in the area under consideration, a determination may be made as to whether there is sufficient vertical and horizontal information. This determination may be made using the parameters that "min_x" is the minimum value of x within the connected edge, "y_for_min_x" is the value of y corresponding to the minimum value of x, "max_x" is the maximum value of x within the connected edge, "y_for_max_x" is the value of y corresponding to the maximum value of x, "min_y" is the minimum value of y within the connected edge, "x_for_min_y" is the value of x corresponding to the minimum value of y, "max_y" is the maximum value of y within the connected edge, "x_for_max_y" is the value of x corresponding to the maximum value of y, "N_x" is max_x−min_x+1, "N_y" is max_y−min_y+1, "y_info" is the absolute value of (max_y−min_y)/(x_for_max_y−x_for_min_y), "x_info" is the absolute value of (max_x−min_x)/(y_for_max_x−y_for_min_x), and T_x1, T_x2, T_y1, and T_y2 represent preset or configurable thresholds.

With these parameters, Total_x, a value for the total number of horizontal edge candidate pixels, may be computed by adding N_x to Total_x for each edge for which N_x is greater than T_x1 and x_info is greater than T_x2. That is, an edge is included as a horizontal edge candidate and the total number of horizontal edge candidate pixels is incremented by N_x if N_x and x_info are greater than the thresholds T_x1 and T_x2, respectively. Otherwise, none of the pixels for the connected edge are used to determine vertical shifts.

Similarly, Total_y, a value for the total number of vertical edge candidate pixels, may be computed by adding N_y to Total_y for each edge for which N_y is greater than T_y1 and y_info is greater than T_y2. That is, an edge is included as a vertical edge candidate and the total number of vertical edge candidate pixels is incremented by N_y if N_y and y_info are greater than the thresholds T_y1 and T_y2, respectively. Otherwise, none of the pixels for the connected edge are used to determine horizontal shifts.

Once all the edges of the area are processed, the total number of candidate edges for each direction, Total_x and Total_y, are compared to the preset threshold, T_total.

If Total_x is greater than T_total, all of the pixels associated with the identified horizontal edge candidates are considered horizontal edge pixels. Otherwise, if Total_x is less than or equal to T_total, the number of horizontal edge candidates is deemed insufficient, and, as such, none of the edges within the area are used for the vertical shift determination.

If Total_y is greater than T_total, all the pixels associated with the identified vertical edge candidates are considered vertical edge pixels. Otherwise, if Total_y is less than or equal to T_total, the number of vertical edge candidates is deemed insufficient, and, as such, none of the edges within the area are used for the horizontal shift determination.

Where no acceptable horizontal and/or vertical edges are identified within an area, an alternate method of obtaining the alignment values for that area in one or more directions may be used. Several alternative methods are discussed below with respect to the alignment vector determination unit 230.

High Intensity Selection

In general, a misregistration at bright areas of an image is more observable and objectionable than a misregistration at darker areas of an image. For example, the eye would more readily observe a red area extending beyond a white area than a red area extending beyond a brown area. As such, it may be desirable to target or exclusively select edges that exist within high intensity areas. Such targeting/selection may be achieved through the construction of an edge map using a process that compares the gray-level pixel intensities associated with each color component image to a threshold. Although described below as being applied to an initial and thus unrefined edge map, high intensity selection may be applied to a refined edge map generated using the previously-described or some other refinement technique, individually or in combination.

For instance, in one implementation, RE_x indicates a particular pixel in the new refined edge map for the x color component image, where x can be either red, green, or blue, E_x indicates a corresponding pixel in the original edge map for the x color component image (where E_x contains either edge or non-edge valued pixels), P_r indicates the original gray-level intensity value for the corresponding pixel for the red component image, P_g indicates the original gray-level intensity value for the corresponding pixel for the green component image, P_b indicates the original gray-level intensity value for the corresponding pixel for the blue component image, and T_h indicates a preset pixel intensity threshold. In this implementation, RE_x is an edge pixel if E_x is an edge pixel, P_r>T_h, P_g>T_h, and P_b>T_h. Otherwise, RE_x is not an edge pixel.

However, because there may be misregistration, some edges that would be categorized as high intensity edges after correct alignment may not be categorized as high intensity edges before correct alignment. To avoid this or other miscategorizations, the definition of a high intensity edge may be relaxed or expanded to be more inclusive. For instance, in one implementation, edge pixels within a window (of relatively small horizontal and/or vertical extent) relative to a high intensity edge also may be categorized as high intensity edge pixels.

After the application of this process on each color component image, the refinement procedure for assessing horizontal and vertical edge information can be applied to generate a more useful set of high intensity edges. Where there is not a sufficient number of useful high intensity edges within an area, the initial edge maps (that is, the edge map obtained before the high intensity edge refinement process was applied) can be used instead. The edge refinement technique for assessing horizontal and vertical edge information then can be applied to this edge map to obtain a useful set of edges within this area. If there is not a sufficient number of edges in this case, an alternate method of obtaining the horizontal and/or vertical alignment for that area may be used, as discussed below. At the conclusion of edge refinement, a new corresponding image consisting of edge and non-edge valued pixels is created and transferred from the feature selection unit 220 to the alignment vector determination unit 230.

Alignment Vector Determination Unit

The alignment vector determination unit 230 may operate on different types of feature maps. Nonetheless, consistent with the examples set forth previously, operation of the alignment vector determination unit 230 will be described, in detail, primarily for edges.

After the edges are obtained for each color component image, they are compared between pairs of color component images in order to determine the alignment vector that will lead that pair of images to be aligned, typically in an optimal manner. Other implementations may, for example, accept an alignment vector that satisfies a particular performance threshold. In one implementation, each pair consists of one color component image that serves as a reference image, and a second color component image that serves as a non-reference image.

In the system 200, one color component image is maintained as a reference image that does not undergo any alignment throughout the film sequence, thus ensuring a constant temporal reference throughout the film sequence to be registered. The green reference image typically is chosen as the reference image due to its relatively high contrast and resolution. However, a red, a blue, or some other color component image may be selected as a reference, or the reference may be varied with time. Other implementations may select a reference, if any, as warranted by a particular application.

There are various possible spatial transformations that can be used to align the color component images of a film frame. These include, for example, affine (which includes, for example, translational, rotational, and scaling transformations), polynomial, or any part or combination of these types of transformations. In one implementation, the transformation is represented as one or more translational alignments in the horizontal and/or vertical directions. The transformation in that implementation can be described using I(x, y) to denote a pixel intensity at location (x, y) for a particular color component image, and let I'(x, y) to denote a pixel intensity at location (x, y) after the translational alignment has been imposed on the color component image. With this notation, after the application of a translational alignment vector of (deltax, deltay), I'(x+deltax, y+deltay) equals I(x, y), where deltax represents the horizontal alignment (displacement) and deltay represents the vertical alignment (displacement).

A translational transformation can be performed, for example, either globally for the entire image or locally within different areas of the image. In some instances relating to misalignment problems within film, the misalignment experienced at the outer areas of the image may differ from the misalignment experienced at the center portion of the image. As such, in one implementation, different alignment vectors are applied to different areas of the image. In particular, localized alignment vectors are determined for various areas of the image, as described below. Note that a global alignment generally is a special case of the more generalized procedure that allows for local alignments.

In one implementation, the color component image is divided into areas arranged in a manner such that the center of at least one area and the center of at least one other area are in different proximity to the center of the image.

For simplicity of description, the case where areas are obtained by segmenting the image into uniformly sized areas is considered below, but other segmentations or partitions also may be used. These areas can have overlapping pixels, that is, some pixels can belong to more than one area within the non-reference image. Further, all areas of an image need not necessarily be processed. Hereafter, the different areas of the image will be referred to as blocks. FIG. 3 provides an example of an image 300 that is divided into sixty-four non-overlapping geometrically-rectangular blocks.

In the alignment vector determination unit 230, for each block within the non-reference edge map image, a distortion value (or alternatively, a similarity value) is computed between a defined set of pixels associated with that block and the corresponding set of pixels in the reference image for a given translational alignment vector (deltax, deltay) using a registration metric such as that defined below. A pixel at location (x+deltax, y+deltay) in the reference image is defined to be the corresponding pixel to a pixel at location (x, y) within a block in the non-reference image for a translational alignment vector of (deltax, deltay). The set of pixels used to compute the registration metric value associated with the block can be a subset of the total pixels associated with the block.

One or more of various registration metrics (distortion/similarity measures) can be used. One general class of measures includes feature-based measures that weight comparisons involving feature pixels in a base image (reference or non-reference) differently, for example, more heavily, than comparisons involving non-feature pixels, where a feature pixel is a pixel determined to possess particular characteristics. One implementation uses a one-sided mismatch accumulator as the distortion measure. In this implementation, the measure may be characterized as accumulating distortion for each pixel in the non-reference image satisfying the conditions that the pixel is identified as part of a feature, but the corresponding pixel in the reference image is not identified as part of a feature. (Note that the term "part," as well as any other similar term, is used in this application broadly to refer to either "all" or "less than all." For example, the above pixels may, in general, contain all of the feature or less than all of the feature.) In this case, the maximum potential distortion for each tested (deltax, deltay) vector would be equal to the number of feature (e.g., edge) pixels within the non-reference image.

One specific implementation is now described. Given a set of pixels associated with the non-reference image to be used in the distortion calculation, for each pixel in this set, a determination is made as to whether the non-reference image contains an edge-type pixel when the reference image does not contain an edge-type pixel at the selected corresponding location for each image. If this case occurs, a positive amount of distortion is assigned to this pixel. Otherwise, a distortion of zero is assigned to the pixel. The positive amount typically is constant for all pixels in the set but may not be constant if, for example, certain areas are to be emphasized or de-emphasized. The distortions for all pixels in the set are summed to obtain the total distortion value for a particular alignment vector.

Using the technique noted above, a total distortion value is computed for a number of candidate (deltax, deltay) alignment vectors, within a particular "window," W, of size (2Wx+1)*(2Wy+1), where Wx, Wy are integers greater than or equal to zero, the absolute value of Wx is greater than or equal to deltax, and the absolute value of Wy is greater than or equal to deltay. The (deltax, deltay) vector that provides the lowest distortion value among the set of distortion values associated with the candidate alignment vectors is then selected as the alignment vector, (deltax_selected, deltay_selected).

Given the one-sided mismatch accumulator distortion measure and associated selection process, the alignment vectors in the associated implementation can be determined by determining an initial alignment, defined as (deltax_i, deltay_i), for the image. In one implementation, the center of the image is used to establish the initial alignment vector upon which other blocks of the image base their alignment vector. As an example, the center can comprise the inner 25% of the image, which may overlap, partially or completely, an arbitrary number of blocks. In particular, given this portion in the non-reference image, the (deltax, deltay) pair that is chosen is the pair that provides the lowest distortion using the one-sided mismatch accumulator distortion measure among a number of candidate (deltax, deltay) vectors. If the candidate pairs are located within a window of 2*Wx_in+1 extent in the horizontal direction and 2*Wy_in+1 extent in the vertical direction, then deltax and deltay will satisfy:

$-Wx\_in+deltax\_i <= deltax <= Wx\_in+deltax\_i$, and $-Wy\_in+deltay\_i <= deltay <= Wy\_in+deltay\_i$.

The alignment vectors for the individual blocks of the image are determined by processing the blocks in a radial manner. Because of the color fringing and larger alignment shifts that can occur toward the outer boundaries of the image in film implementations, the order in which the areas are processed and in which their alignments are determined is based, in one implementation, upon a radial path that begins near the center of the image and then progresses outward. Continuing the example given above, in which the non-reference image is divided into sixty-four non-overlapping blocks, a radial ordering can be attained, for example, if the blocks are grouped into four different rings. A radial ordering refers to processing blocks based on some measure of their distance from a chosen reference point, and, further, processing the blocks in either a generally increasing or a generally decreasing distance from the chosen reference point, such as for example, the center of an image. As discussed below, a radial ordering also may process blocks randomly within a ring, where the rings are processed according to either a generally increasing or generally decreasing distance using some measure of distance. An inner ring is a ring that is positioned a smaller distance, using some measure, from the chosen reference point than a ring under consideration. Similarly, an outer ring is positioned a larger distance from a chosen reference point than a ring under consideration. An innermost ring has no ring that is closer to the chosen reference point.

Figure 4:
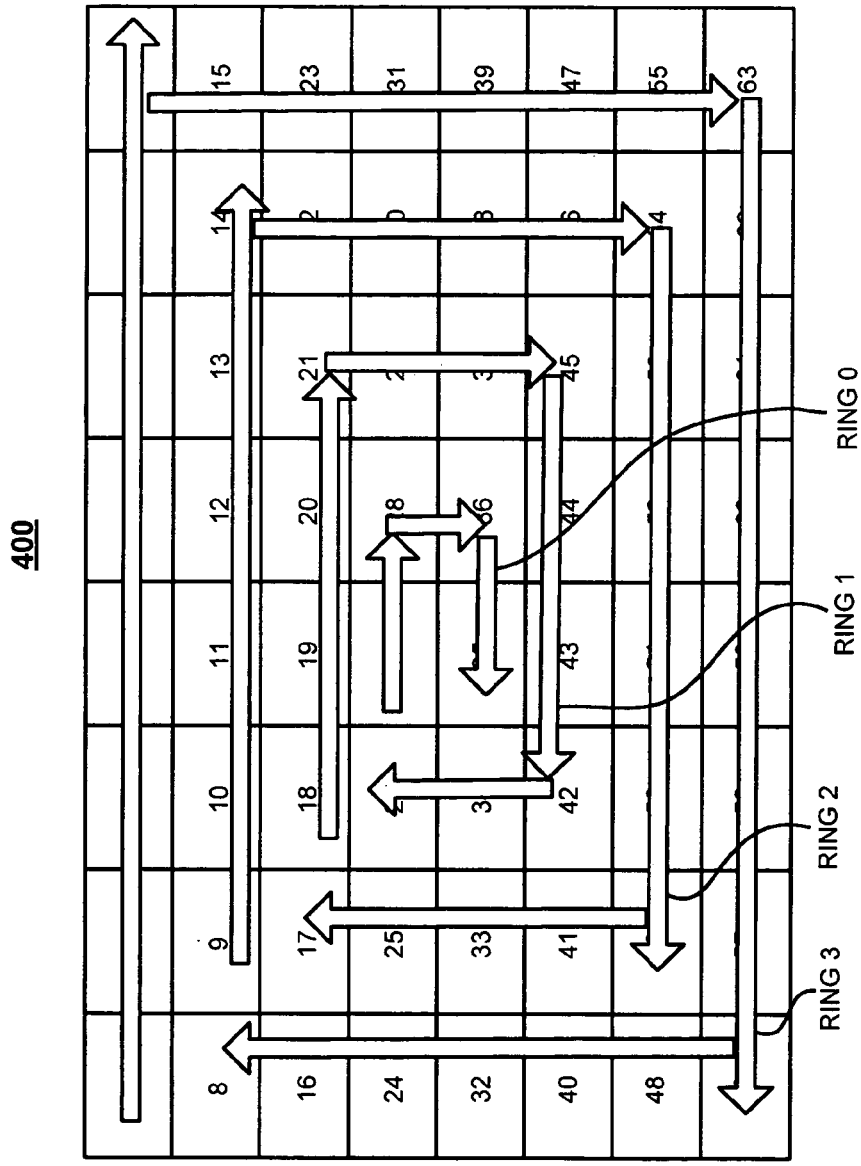
FIG. 4 is a diagram of one implementation of a processing order for the partition of FIG. 3.

FIG. 4 illustrates four different rings. These rings are concentric. The determination of the selected alignment vectors of the blocks proceeds, in this implementation, by first processing the blocks in the first ring (ring 0) consisting of blocks 27, 28, 35, and 36. Next, blocks within the second ring (ring 1) are processed, that is, blocks 18-21, 29, 37, 45-42, 34, and 26. Subsequently, blocks within the third ring (ring 2) are processed, that is, blocks 9-14, 22, 30, 38, 46, 54-49, 41, 33, 25, and 17. Finally, blocks within the fourth ring (ring 3) are processed, that is, blocks 0-7, 15, 23, 31, 39, 47, 55, 63-56, 48, 40, 32, 24, 16, and 8. The manner in which each ring is processed may vary in different implementations. For illustrative purposes, a clockwise encirclement for the different rings is demonstrated, that is, the blocks within a particular ring are processed in a clockwise manner. For each block, a translation alignment vector is determined by establishing an initial translation alignment vector for the block. In one implementation, these initial translation alignment vectors may be determined based on the alignment vectors of their neighboring block(s), where these neighbors belong to the set of blocks that have already been processed and that share a common border or pixel(s) with the block under consideration. However, in other implementations, the blocks may not share a common border or pixel or the initial vector may be set by default or chosen at random.

The initial alignment vector for the block under consideration may be equal to a function of the neighbors of the block under consideration that have already been processed. If a clockwise progression is used, the set of neighbors for block 21 that have already been processed consists of blocks 20 and 28. Similarly, the set of neighbors for block 6 that have already been processed consists of blocks 5, 13, and 14. The function can be defined in a number of ways. For example, the function may be a weighting of the alignment vectors among each of the neighbors or the alignment vector of one or more neighbors that provide the minimum distortion for the block under consideration.

In implementations that emphasize the radial configuration, the neighbor can be chosen to be the inward radial neighbor of the current block under consideration. An inward radial neighbor is any neighboring block having a distance, using some measure, that is no further from the chosen reference point than is the block under consideration. This implies, for example, that the initial translational alignment vector for blocks 9, 10, and 17 would all be equal to the selected translational alignment vector determined for block 18, and that the initial translational alignment vector for block 11 would be equal to the selected translational alignment vector determined for block 19. This may be computed, for example, by defining "numsideblocks" as an even number representing the number of blocks in the horizontal direction, denoting each block as "index" using an "index number" obtained by labeling the blocks within each image in a raster scan order. For each outer ring m (m=1, 2, 3) and for each block n (n=0, ..., 8*m+4) within ring m, where n increases in a clockwise direction as illustrated in FIG. 4, the neighbor for a particular block can be defined as follows:

if (n is equal to 0) neighbor=index+numsideblocks+1;
else if (n<(2*m+1)) neighbor=index+numsideblocks;
else if (n is equal to(2*m+1)) neighbor=index+numsideblocks−1;
else if (n<(2*m+1)*2) neighbor=index−1;
else if (n is equal to(2*m+1)*2) neighbor=index−numsideblocks−1;
else if (n<(2*m+1)*3) neighbor=index−numsideblocks;
else if (n is equal to(2*m+1)*3) neighbor=index−numsideblocks+1; and
else neighbor=index+1.

For the inner ring, the initial estimate can be computed in a similar manner or any other suitable manner. For example, the blocks within the inner ring can use the translational alignment vector determined for the center portion of the image as their initial estimate. In addition, the center portion of the image can use a preset initial alignment vector, which may be, for example, no initial displacement, or the displacement for the central block or blocks of a previous frame.

Given the initial estimates, deltax_i and deltay_i and the associated distortion for the block under consideration, the distortion associated with a number of candidate alignment vectors that represent different displacements can be calculated. These alignment vectors are taken, for example, from a set of vectors within a window described by the following equations:

$$-Wx(m, n)+\text{deltax}\_i <= \text{deltax\_selected} <= Wx(m, n)+\text{deltax}\_i, \text{ and}$$

$$-Wy(m, n)+\text{deltay}\_i <= \text{deltay\_selected} <= Wy(m, n)+\text{deltay}\_i.$$

In these equations, Wx and Wy are integers greater or equal to 0, and the dependence of Wx and Wy on m and n indicates that the horizontal and vertical window areas can be different dimensions for different rings or even different blocks within a ring. The alignment vector that corresponds to the displacement that produces the minimum distortion among the candidate displacements chosen from this set then is selected to be the alignment vector, (deltax_selected, deltay_selected), for the block. Other implementations may use different selection criteria.

Recall that Wx_in and Wy_in represent the window sizes in the x and y directions, respectively, that are used to determine the initial alignment vector for the entire image. If Wx(m)<Wx_in and Wy(m)<Wy_in, for m>=0, computational complexity is reduced because the set of candidate displacements is smaller in size. In one implementation, Wx(m, n) and Wy(m, n) for m, n>=0 are much less than Wx_in and Wy_in, respectively, resulting in a large increase in efficiency. In addition, by setting Wx(m, n) and Wy(m, n) to small values, the opportunity for visible discontinuities between adjacent blocks may be decreased.

There are a number of strategies that may be employed to determine the selected candidate within a particular window of dimension (2*Wx+1)*(2*Wy+1). A straightforward approach is to check every displacement possibility within the window. Another implementation uses a spiral search with a partial distortion measure to determine the selected displacement or alignment vector. In particular, the different displacements are considered in an order that begins at the location associated with the initial alignment vector and proceeds radially outward in a spiral scanning path. Because the one-sided mismatch accumulator is a cumulative distortion, it is possible to periodically compare the current minimum distortion to the distortion accumulated after only a partial number of the pixels within the block (that have been chosen to be used in the distortion calculation) have been processed. If the partial distortion sum is found to be greater than and/or equal to the current minimum distortion, then the candidate location cannot provide the minimum distortion and the other pixels in the block need not be processed.

A spiral search with a partial distortion measure reduces the computational complexity associated with the search of all the candidate locations. In particular, because the initial alignment vector is a function of the neighboring blocks' selected alignment vectors, it is likely that the block under consideration will have lower distortion with this alignment vector or with an alignment vector that corresponds to a displacement that is close in distance to this initial alignment vector rather than an alignment vector that corresponds to a displacement that is farther away in distance from the initial alignment vector. As such, in the calculation of the distortion for a particular candidate displacement, it is likely that the distortion will exceed the current minimum value before a complete check of all of the pixels associated with the block that are chosen to be used in the distortion calculation.

In another implementation, a method that does not search all displacement possibilities within the window can be used in order to reduce the computational complexity of the search. In one implementation, an iterative algorithm can be employed in which the selected alignment vector (corresponding to a particular candidate displacement) is first chosen for one direction (e.g., vertical), and this result then is used as the initial alignment vector in the search for the selected alignment in the orthogonal direction (e.g., horizontal), and this process then is iterated until a particular stopping condition is met. Such an implementation may use different features, for example, vertical and horizontal edges, to determine the alignment vectors for the horizontal and vertical directions, respectively.

For the case where separate horizontal and vertical edge information is retained, the following provides an example of a method that can be used to select one candidate alignment vector from a set of candidate alignment vectors for a given block. First, initial conditions are set (step 1). In particular, the distortion_y associated with the initial alignment vector (deltax_i, deltay_i) is determined using the horizontal edge information, and minimum_y, the minimum distortion in the vertical direction, is set equal to distortion_y, and the selected vertical displacement deltay_selected(0) is set equal to deltay_i. In addition, deltax_selected (0) is set equal to deltax_i.

Then, for i=1, until the appropriate stopping condition is met, the selected vertical shift is determined using the horizontal edge information (step 2-1). This may be done by calculating the distortion_y associated with each of the candidate displacement possibilities (deltax_selected(i−1), deltay+deltay_selected(i−1)) taken from the set −Wy<=deltay<=Wy, using the one-sided mismatch accumulator distortion measure (step 2-1-1). For the first iteration, it is not necessary to calculate the distortion value, distortion_y, for deltay=0 because it has already been calculated. For all other iterations, it is necessary to calculate the distortion value associated with deltay=0.

The minimum distortion_y among the set of calculated distortion values then is found, and deltay_selected is set to be the sum of the deltay that produces this minimum distortion value and deltay_selected(i−1), and this distortion value is set to be the new minimum distortion value, minimum_y (step 2-1-2). A determination then is made as to whether the stopping condition for a particular direction has been met (step 2-1-3). If so, step (2-1) will not be repeated after step (2-2).

Next, the selected horizontal shift is determined using the vertical edge information (step 2-2). This is done by calculating distortion_x associated with each of the candidate displacement possibilities (deltax+deltax_selected(i−1), deltay_selected(i−1)) taken from the set −Wx<=deltax<=Wx, using the one-sided mismatch accumulator distortion measure (step 2-2-1).

The minimum distortion_x among the set of calculated distortion values then is found, deltax_selected is set to be the sum of the deltax that produces this minimum distortion value and deltax_selected(i−1), and this distortion value is set to be the new minimum distortion value, minimum_x (step 2-2-2). A determination then is made as to whether the stopping condition for a particular direction has been met. If so, step (2-2) will not be repeated after step (2-1).

Each stopping condition can be, for example, based on a preset number of iterations or on the condition that the selected alignment vector for a block for iteration i is the same as that for the preceding iteration, for example, when deltax_selected(i−1)=deltax_selected(i) and deltay_selected (i−1)=deltay_selected(i), among others.

A similar implementation that reduces the number of candidate locations searched can be performed using edge information that is captured for both vertical and horizontal directions simultaneously (for example, the edge information is based on the magnitude of the edge strength). In such a case, the distortion value computation at (deltax_selected (i−1), deltay_selected(i−1)) for iteration i need not be calculated because it already has been calculated in iteration i−1, and the single edge-map information is used instead of the horizontal and vertical edge maps discussed above.

If there is not a sufficient number of useful edges in a particular direction within a block to be registered within the non-reference image or within a corresponding block in the reference image, an alternative method may be performed to select an alignment vector for this block. For example, the alignment for that direction can simply be taken to be the initial alignment for that direction. Alternatively, a larger area encompassing more blocks (or even the entire image) can be used to determine the selected alignment vector for this block. Other alternative or additional methods can also be used to select an alignment vector for this block. In one implementation, if the center portion of the image does not have enough useful edges, the alignment vector for the center is set to the selected alignment vector determined from the entire image.

Alignment Vector Application Unit

After the alignment vector determination unit 230 determines the alignment vector for each block within the color component image, the alignment vector application unit 240 aligns each block using these vectors or a modification of them. If, for example, only one block exists within the image and only one global alignment vector is computed, then the alignment is straightforward. If, however, the image has been segregated into multiple blocks, the image can be spatially aligned by a number of different methods.

One technique that can be used for alignment involves applying a uniform alignment to each block by its corresponding alignment vector. However, different blocks within that color component image may have different alignment vectors. In such a case, discontinuities may exist at a boundary between blocks.

The alignment vector application unit 240 attempts to reduce the perceptual effects of discontinuities by "feathering" at the boundaries between blocks with different alignment vectors, as described below. In the implementation of system 200, this technique is applied only to the non-reference images (recall that the non-reference images are shifted with respect to the reference image).

Although the feathering process will be described hereinafter with reference to horizontal and vertical alignment values to maintain consistency with early examples, the feathering process also is applicable to other types of transformations. Feathering is performed, in this implementation, along the y-axis boundaries between two horizontally neighboring blocks, along the x-axis boundaries between two vertically neighboring blocks, and for the four-corner boundaries between four neighboring blocks.

Figure 5:
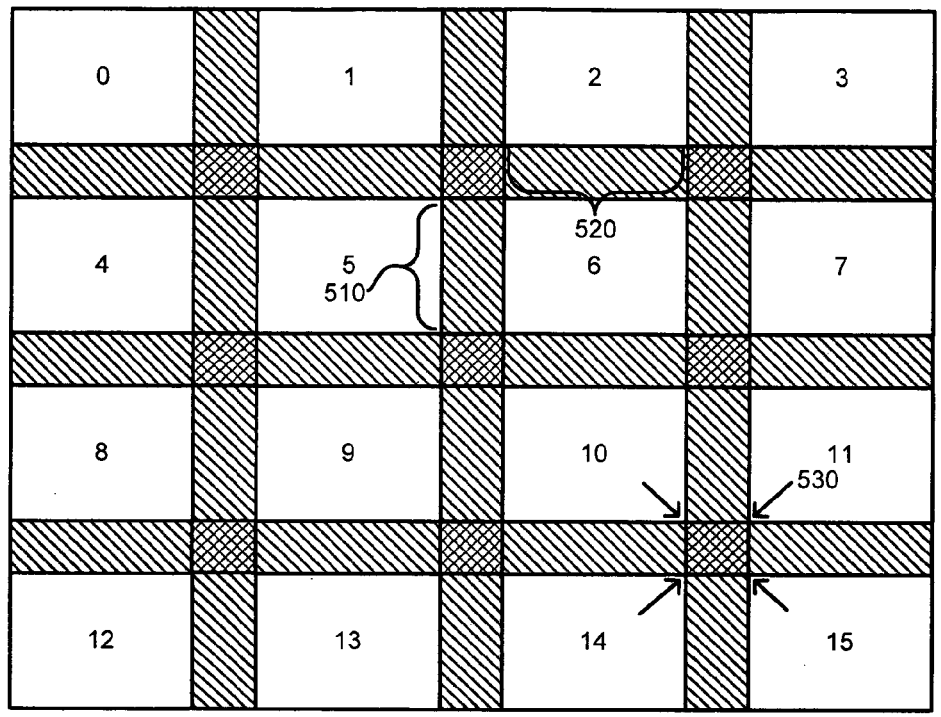
FIG. 5 is a diagram highlighting areas in which one implementation applies feathering.

For instance, FIG. 5 provides an example 500 identifying several pixels that are affected by the feathering scheme described above when the image is divided into sixteen uniformly sized areas. For each y-axis boundary, feathering is performed across a particular-sized horizontal window. For example, for the y-axis boundary between blocks 5 and 6, the window 510 may be used. For each x-axis boundary, feathering is performed across a particular-sized vertical window. For example, for the x-axis boundary between blocks 2 and 6, the window 520 may be used. For each of the four-corner boundaries, feathering is performed across a particular-sized vertical and a particular-sized horizontal window. For example, for the four-corner boundary between blocks 10, 11, 14, and 15, the window 530 (arrows point to corners of window 530 in FIG. 5) may be used. The sizes of these "feather windows" typically impact the rate at which the alignment values for the pixels at the boundaries blend from one value to another. In one implementation, the window size is determined as a function of the maximum (max) of the difference between the x alignment values of the neighboring blocks and the difference between the y alignment values of the neighboring blocks. However, many techniques may be used to determine the size and/or shape of the various windows. These windows need not be rectangular or continuous.

In one implementation, within the feather window, new alignment values are obtained by linearly interpolating between the different alignment values of the neighboring blocks under consideration. Another implementation uses non-linear interpolation. In either case, the interpolated alignment values then are used to obtain the new intensity value of the pixel at a particular location. In particular, the pixel at the location corresponding to the selected alignment value is used as the value for the current location. If the selected alignment value in a particular direction is not an integer, then the intensity values of the pixels that correspond to the two integer-valued displacements closest in distance to the selected displacement are appropriately weighted and combined to obtain the final new intensity value.

Note that the calculation of the new alignment vectors within the feathering window may be performed in the alignment vector determination unit 230 rather than the alignment vector application unit 240. The calculation of the new intensity values within the feathering window would still be performed in the alignment vector application unit 240. Other implementations may perform many of the various described operations in different orders or in different functional blocks.

As an example of the feathering scheme, assume (dx1, dy1) is the alignment vector for block 5, and (dx2, dy2) is the alignment vector for block 6. In this example, feathering across the y-axis boundary that is shared between these two blocks is addressed, and for simplicity, the corner conditions are not addressed. Then the size of the feather window can be "fwsize" constant*max(abs(dx1−dx2), abs(dy1−dy2)), where abs( ) indicates the absolute value function. Assume the boundary location is at (x3, y3) and the height of the block is "blockh." Then, the alignment values will be interpolated from the x3−(fwsize/2) position to the x3+(fwsize/2) position in the x direction for each of the rows from the vertical start of the block to the vertical start of the block+blockh. For example, assume that max(abs(dx1−dx2), abs(dy1−dy2))=abs(dx1−dx2). Then, the horizontal alignment value for the point (x4, y4) is computed as (dx1+(x4−(x3−(fwsize/2)))*(dx2−dx1)/(fwsize)) and the vertical alignment value for the point (x4, y4) is computed as (dy1+(x4−(x3−(fwsize/2)))*(dy2−dy1)/(fwsize)). The new value at a particular location is the value of the pixel at the calculated displacement location (or the weighted combination of the intensities at the nearest integer grid points). Note that special care may need to be applied to the boundaries of the image when the feathering approach is used.

Another implementation adjusts for discontinuities by using warping. Although the warping process will be described hereinafter with reference to horizontal and vertical alignment values to maintain consistency with early examples, the warping process also is applicable to other types of transformations. In one example of a warping technique, each block can be identified with a control point at its center. The horizontal and vertical alignment values that were obtained for each block can become the alignment values for the block's control point. The alignment values for the remaining pixels within the image may be obtained by interpolating between the alignment values of the nearest control points. These alignment values are then applied to the pixels within the non-reference image.

Composite Phase Unit

Figure 6:
FIG. 6 is a picture illustrating a result of applying one implementation of a registration technique to the picture in FIG. 1.

Once the non-reference images are aligned by the alignment vector application unit 240, the images can be recombined into a composite color frame by the composite phase unit 250. FIG. 6 illustrates a composite frame after the composite phase unit 250 has been applied to three color component images. In one implementation, a laser film printer is optionally used to avoid the loss of resolution incurred with an optical printer.

Temporal Implementations

The selection of a transformation for a particular frame may use temporal information, that is, information from one or more frames that precede, succeed, or both precede and succeed, in time, the frame under consideration. With respect to film applications, because film is a sequence of frames, using information from neighboring frames may enable a temporally smoother visual experience. In addition, it may be beneficial to take advantage of the fact that consecutive frames often are shifted similarly during the photographic process.

There are a number of strategies that may be employed to use information from other frames to influence the selection of the transformation for a current frame, and a variety of implementations are illustrated below. In these implementations, the transformation is assumed to be an alignment vector, but other transformations may be used in addition to or in lieu of an alignment vector.

To illustrate, several implementations are described hereafter, based on the following definitions:

(i) $R\_i$, $G\_i$, and $B\_i$ are the set of three color component images (red, green, and blue, respectively) corresponding to a set of N frames, where "i" varies from 1 to N, (ii) $G\_i$ is selected to be the reference frame, and $R\_i$ is selected to be the non-reference frame, (iii) $V\_i=f(R\_i, G\_i)$ is the alignment vector corresponding to the red component of frame "i," for i=1 to N, where V_i may be chosen from among multiple vectors, and is preferably the optimal vector, based on information from the single frame "i," and (iv) $V\_i\_new = f(V\_(i-j), \ldots, V\_i, \ldots, V\_(i+k),$
    $R\_(i-j), \ldots, R\_i, \ldots, R\_(i+k), G\_(i-j), \ldots,$
    $G\_i, \ldots, G\_(i+k))$,   (equation 1)

where j and k are non-negative integers, and V_i_new is the new alignment vector chosen for the red component of frame "i."

Equation 1 shows that the new alignment vector may be a function of the alignment vectors and image data associated with the current frame, as well as past and future frames. In one implementation, the similarity (or lack thereof) between a current and neighboring (past or future) frame, either reference frames or non-reference frames, influences the extent to which alignment vectors based on the neighboring frames are used in the determination of the new alignment vector for the current frame. Equation 1 may be generalized to include additional information in the determination of V_i_new. For example, such additional information may relate to the current frame or other frames, or may be unrelated to the frames.

Figure 7:
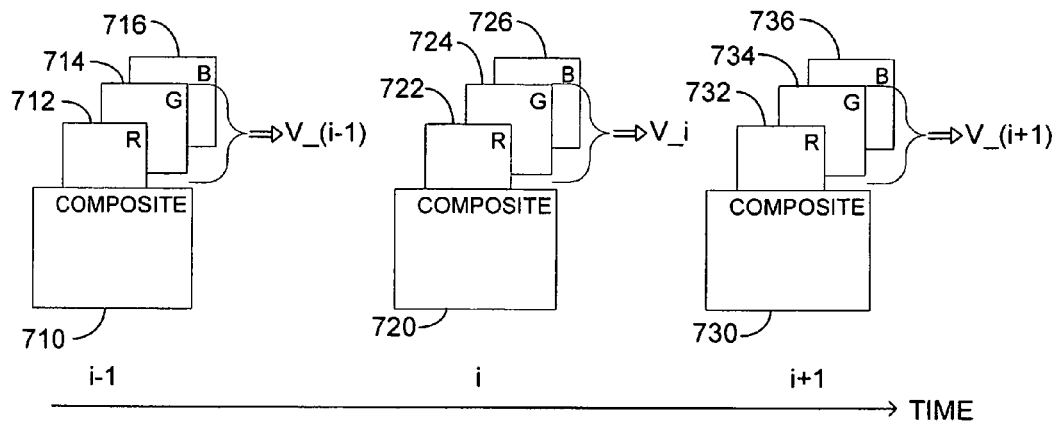
FIG. 7 illustrates three sequential composite frames, their respective color components, and an alignment vector corresponding to the red component of each frame.

Referring to FIG. 7, three sequential composite frames 710, 720, and 730 are displayed, along with the red, green, and blue color component images for each frame 710, 720, and 730. A red component 712, a green component 714, and a blue component 716 may be combined to form composite frame 710. Similarly, a red component 722, a green component 724, and a blue component 726 may be combined to form composite frame 720. And a red component 732, a green component 734, and a blue component 736 may be combined to form composite frame 730. In accordance with the above definition of V_i, FIG. 7 illustrates that V_(i-1) is a function of color components 712 and 714, V_i is a function of color components 722 and 724, and V_(i+1) is a function of color components 732 and 734.

Note that, in equation 1, the alignment vectors from past and future frames that are used to determine the new alignment vector (for a current frame) are generated using information from the respective past or future frame only. Alternatively, or in addition, the new alignment vector (for a current frame) may be based on the new alignment vectors for one or more past or future frames. The following equation illustrates an example in which the new alignment vector (for a current frame) is based on new alignment vectors for past frames, and the existing alignment vectors for the current frame and future frames.

$V\_i\_new = f(V\_(i-j)\_new, \ldots, V\_(i-1)\_new, V\_i, \ldots, V\_(i+k), R\_(i-j), \ldots, R\_i, \ldots, R\_(i+k),$
$G\_(i-j), \ldots, G\_i, \ldots, G\_(i+k))$.   (equation 2)

Other variations are also possible. For example, V_i_new could be a function of new vectors for future frames and could also be a function of all color component images for one or more frames.

Equations 1 and 2 each allow for different weights to be applied to the various components. For example, in one implementation of equation 1, j=1, k=0, and the dependence of the new alignment vector on R_m and G_m is weighted as 0 for all "m" not equal to "i." That is, the new alignment vector is based only on information from the current frame and on the alignment vector from the previous frame. The example shows that weighting may be used to diminish the impact of the frames. Other examples may diminish the impact more gradually of frames having a progressively greater distance (in time).

The generality of equations 1 and 2 also envisions implementations that directly use only, for example, temporal information. For example, consider an implementation having a series of frames that include relatively static content, such as, for example, opening titles. Such an implementation may determine an alignment vector for the first frame of the series using only spatial information for the first frame, and then may apply the alignment vector to the entire series of frames, thus determining the alignment vectors for the remaining frames in the series using only temporal information (and not using any spatial information per se from the remaining frames).

Temporal information may also be used at various different points in a registration process. For example, a first pass may be used to determine alignment vectors (optimal or otherwise) for each frame without considering temporal information, then a second pass may be used to consider temporal information, or vice versa. By using two separate passes, the determination of a new alignment vector for a given frame is able to be based on alignment vectors from past and future frames. As another example, a single pass may be used that considers both the information within a frame (non-temporal) and information (including alignment vectors) from one or more previous frames (temporal). Single pass implementations also may consider information from future frames, but would not have access to alignment vectors for future frames unless those alignment vectors were already determined.

In addition to using temporal information at various different points, implementations may use temporal information in various different ways. For example, the temporal and non-temporal information may be considered separately and only combined at the end of the process of determining an alignment vector. Such an implementation may, for example, determine two proposed alignment vectors (with a first of the two being determined using only temporal information and a second of the two being determined using only spatial information), and then compare results achieved with the two proposed alignment vectors. One such implementation proceeds by (i) determining an alignment vector V_i for a current frame "i" based only on information in the current frame, (ii) determining the distortion that results from the application of V_i to frame "i," (iii) determining the distortion resulting from the application of V_(i-1) to frame "i," and (iv) selecting as V_i_new either V_i or V_(i-1), depending on which alignment vector resulted in the lower distortion for frame "i."

In contrast, temporal and non-temporal information may be integrated such that each is used in the generation of a single proposed alignment vector. Such an implementation may proceed by, for example, using V_(i-1) as an initial alignment vector for frame "i," and then iterating through various other alignment vectors in a window around V_(i-1) to find the vector that produces the lowest distortion for frame "i." In this way, the temporal information (V_(i-1)) is used as a starting point and is modified based on non-temporal information (the distortion results for frame "i").

As the above examples reveal, temporal information may be considered, for example, before or after non-temporal information. Implementations also may, for example, consider temporal information both before and after, or at the same time as, non-temporal information.

Using both temporal and non-temporal information may involve a tradeoff. In typical applications, using temporal information produces better temporal stability, and using non-temporal (spatial) information produces better spatial registration. However, the "best" alignment vector chosen using the temporal information may not be the same as the "best" alignment vector chosen using the spatial information. In such a case, there is a tradeoff between the objectives of temporal stability and spatial registration, and the implementation must determine which objective to favor or bias toward. Such a bias could be constant for a series of frames or may vary depending on factors such as scene content. For example, alignment vectors for frames that make up a static scene may be biased toward temporal stability, and alignment vectors for frames that involve movement may be biased toward greater registration within each frame.

Bias may be achieved in various ways. For example, consider an implementation in which a distortion is computed by applying the best alignment vector of the previous frame, V_(i−1), to the current frame "i." If the distortion associated with using V_(i−1) is "low enough," then V_(i−1) also may be used as the "best" alignment vector for the current frame "i." "Low enough" may be defined, for example, as a distortion value that is within a particular adaptive threshold of the minimum distortion that results from applying V_i (the alignment vector selected for the current frame when only information from the current frame is used). An adaptive threshold may be defined as, for example, 110% of the distortion associated with V_i, and such an implementation would be biased toward using V_(i−1) in that higher distortions would be tolerated with V_(i−1) as compared to V_i. The following pseudo-code may be used to determine V_i_new using an adaptive threshold:

if D(V_(i−1), R_i, G_i)<(Bias Factor)*D(V_i, R_i, G_i),
then V_i_new=V(i−1),
else V_i_new=V_i, where D(V_(i−1), R_i, G_i) is the distortion resulting from applying alignment vector V_(i−1) to frame "i," and "(Bias Factor)*D(V_i, R_i, G_i)" is the adaptive threshold.

Bias Factor may be, for example, set to 1.1 as discussed above. The bias factor also may be, for example, variable. A variable Bias Factor may be varied based on, for example, the content of the frame and/or the previous frame, and may be varied, for example, manually or automatically.

Bias also may be applied when using the spatial distance between alignment vectors as a metric. For example, a metric may be the distance between alignment vector V_i, which is based only on current frame "i," and alignment vector V_(i−1), which is based only on previous frame "i−1." Note that such a distance metric does not consider the actual frame content per se, but only the distance between alignment vectors. In an implementation using this distance metric, V_(i−1) may be selected as the alignment vector for frame "i" (V_i_new) if the distance between V_(i−1) and V_i is less than a threshold. A larger threshold provides a greater bias toward V_(i−1), and toward temporal stability. Implementations may use a constant threshold, such as, for example, 1 or 2 pixels for a one-dimensional implementation. Implementations also may use an adaptive threshold, such as, for example, setting the allowable distance equal to a percentage of the length of one or more of the alignment vectors. The threshold may be based on, for example, the resolution of the frame (for example, 2048×1536) and/or the content of the frame (for example, the frame content may be part of a static or a moving scene).

Figure 8:
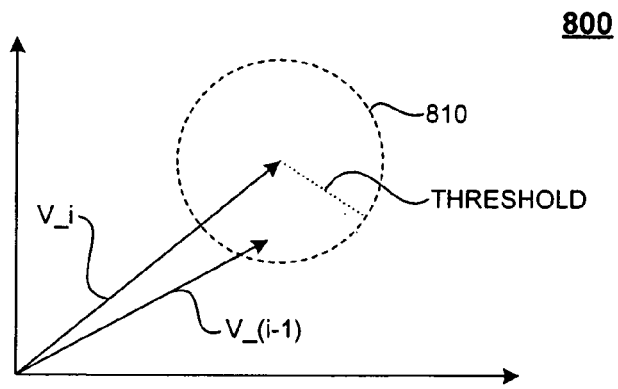
FIG. 8 is a graph illustrating a distance distortion metric.

Referring to FIG. 8, a graph 800 shows a two-dimensional implementation of a spatial distance metric using a constant threshold. Alignment vector V_i is shown surrounded by a dashed circle 810 of fixed radius equal to the constant threshold. Alignment vector V_(i−1) is shown as lying within circle 810, revealing that the spatial distance between V_i and V_(i−1) is less than the threshold.

Implementations also may apply the spatial distance metric, as with many other metrics, separately to each of multiple dimensions. Further, various other distortion metrics also may be used, such as, for example, the one-sided mismatch accumulator discussed earlier. Additional distortion metrics are discussed further below, and a distortion metric also may be defined as a function of one or more other metrics.

Several implementations are now described for using temporal information. These examples include a mode filter, a running average filter, a running median filter, and a sign change filter. These filters may be referred to as smoothing filters and may be implemented as a second pass that occurs after a first pass in which the set of alignment vectors is determined by considering only information in the current frame.

Mode Filter:

Given a set of alignment vectors V_i, i=1, . . . , N, a new alignment vector V_mode is determined that will be applied to frames 1 through N. V_mode may be determined as follows:

V_mode=V_i, such that V_i is the most common vector among the set V_1, . . . , V_N.

For example, for a set of one-dimensional alignment vectors {12, 14, 15, 16, 16, 16, 16, 15, 12}, V_mode is 16.

Running Average Filter:

Given a set of alignment vectors V_i, i=1, . . . , N, the new set of vectors, V_i (mean), are generated as follows:

V_i (mean)=sum(V_, . . . , V_(i+k))/(k+1), for a fixed value of k>0, for all i=1, . . . , N.

For example, let:

(i) k=8, and (ii) V_i, . . . , V_(i+k)={12, 14, 15, 16, 16, 16, 16, 15, 12}.

Then, using the above-defined equation, V_i (mean)=132/9=14 2/3 and this mean value could, for example, either be truncated or rounded up. Alternatively, fractional distances could be used by, for example, interpolating pixel values at locations corresponding to alignment values of 14 and 15.

In this implementation, V_i (mean) uses a moving window of size k+1 that is forward-looking. Implementations may be, for example, forward-looking, backward-looking, or a combination of forward-looking and backward-looking.

Running Median Filter:

Given a set of alignment vectors V_i, i=1, . . . , N, a new set of vectors, V_i (median), are generated as follows:

For each frame "i" define:

(i) a moving window of vectors W_i={V_(i−j), . . . , V_i, . . . , V_(i+k)}, wherein k and j are non-negative integers, (ii) P=k+j+1, and (iii) a set S_i that consists of the vectors of W_i sorted in order of increasing or decreasing length.

Then, the new alignment vectors are defined as:

(i) V_i (median)=S_i[(P+1)/2], if Pmod2=1, or (ii) V_i (median)=(S_i[P/2]+S_i[(P/2)+1])/2, if Pmod2=0, where S_i[x] is the xth vector in set S_i.

For example, let:

(i) j=k=4, in which case P=9 and Pmod2=1, and (ii) W_i={12, 14, 15, 16, 16, 16, 16, 15, 12}.

Then:

(i) S_i={12, 12, 14, 15, 15, 16, 16, 16, 16}, and (ii) V_i (median)=S_i[5]=15.

In another implementation, an average filter or a median filter is applied to an entire set of frames and the resulting alignment vector is applied to all frames within that set.

Sign Change Filter:

Temporal artifacts may arise from the application of new alignment vectors to a series of frames if, for example, the new vectors produce undesired movements of the scene content in alternating directions. For example, if a sequence of alignment vectors consisted of {12, 12, 12, 10, 10, 12, 12}, this alternating movement may be observable even if color fringing from misregistration is eliminated. As a result, it may be desirable to reduce these types of changes. This can be done by applying a filter that is a function of the sign (direction) changes within a sequence. For example, if alternating sign changes are detected within a set of alignment vectors, the minority values (the value 10 in the example above) may be changed subject to various constraints.

One implementation is described by the pseudo-code below. The code corresponding to this pseudo-code examines the intervals between sign changes and detects sign changes that do not persist longer than a defined "extent," which defines undesirably short intervals between sign changes. The "extent" is chosen such that if the intervals are larger than the "extent," then the sign changes are infrequent enough in time and the changes may not be as perceivable to the viewer, so that correction may not be necessary. By contrast, if an interval is not larger than "extent," then the sign changes are too frequent and the changes may be perceived by a viewer and, thus, may require correction. The pseudo-code also includes an algorithm for determining whether correction of a detected sign change would introduce too much misregistration, as measured by a distortion metric, and avoiding such corrections.

Given a set of alignment vectors $V\_i$, $i=1, \ldots, N$, define the sign associated with a vector, $V\_i$, as:

$$\text{sign}(V\_i)=1, \text{ if } (V\_i-V\_(i-1))>0,$$

$$\text{sign}(V\_i)=-1, \text{ if } (V\_i-V\_(i-1))<0, \text{ and}$$

$$\text{sign}(V\_i)=0, \text{ if } (V\_i-V\_(i-1))=0. \quad \text{(equation 3)}$$

Then apply the following algorithm:

```
/* set origi equal to the current frame under consideration */
origi=i;
    /* determine current sign change */
sign1=sign(V_i);
count=1;
    /* advance i and count until end of string is detected */
    /* need to determine (below) if string length (which is count) is <=extent */
while (V_(i+1)=V_i) {
    count++;
    i++}
sign2=sign(V_(i+1));
    /* need sign2 to determine (below) if sign changes are alternating */
if ((sign1 !=sign2) && (count<=extent) && (D<=distortion_max)),
then modify(V_origi, ..., V_(origi+count-1))
```

Note that (i) in the above implementation, "extent" is defined, in a consistent yet more specific manner than above, as the maximum number of consecutive frames (with each frame having the same alignment vector) for which the alignment vectors would all be changed, (ii) D=distortion associated with modifying the vectors $V\_origi, \ldots, V\_(origi+count-1)$ according to the modify( ) function, and (iii) modify($V\_origi, \ldots, V\_(origi+count-1)$) indicates that the vectors $V\_origi, \ldots, V\_(origi+count-1)$ are modified based on information from frames neighboring frame "origi" and/or frame "origi+count." One example of a modify function is modify($V\_origi, \ldots, V\_(origi+count-1)$)=$V\_(origi-1)$.

As an example, the pseudo-code may be applied to the set of alignment vectors {12, 12, 12, 10, 10, 10, 12}. The pseudo-code may be tailored to handle boundary conditions in a variety of ways, so the example will be explained for "i" beginning at 4. Applying the pseudo-code with i=4, sign1 is set to negative one because $V\_4$ (10) is less than $V\_3$ (12). The while loop executes twice because $V\_6=V\_5=V\_4$ (10), and the while loop exits with count set to three and with "i" set to 6. Sign2 is set to one because $V\_7$ (12) is greater than $V\_6$. Assuming that "extent" is at least three and that the distortion condition is satisfied, the "then" statement will be executed because sign1 does not equal sign2. Assuming the modify function sets the vectors of interest equal to $V\_(origi-1)$, then $V\_4$, $V\_5$, and $V\_6$ are set to 12. This results in a new set of alignment vectors {12, 12, 12, 12, 12, 12, 12} which is smoother than the original set of alignment vectors.

As indicated earlier, the sign change filter generally attempts to determine when frames (or, for example, separations or edge maps related to the frames), or portions thereof, in a sequence are being transformed in alternating directions. Accordingly, the sign change filter may be extended to other transformations by associating a sign change with an appropriate indicator of the direction of the transformation. The indicator may include, for example, a shift indicator, a rotation indicator, and a scaling indicator.

In addition to the filters described above, other types of filters and combinations may be used. For example, (i) a median filter and average filter may be applied to fixed blocks, (ii) a mode filter may be applied to a moving window, (iii) a mode filter may include a threshold requiring, for example, that the percentage of frames in a block that have the "most common" value be at least a threshold percentage, (iv) a spline filter may be applied, and (v) filters may look forward, backward, or both.

The new alignment vectors that result from a smoothing filter may be subject to additional constraints in an effort to maintain the misregistration within a particular frame (or the cumulative misregistration within a set of frames) at or below a negligible or unperceivable level, if possible. For example, a distortion constraint may be imposed in conjunction with or subsequent to a smoothing operation. The sign change filter discussed above uses a threshold distortion constraint of distortion_max, and if the distortion resulting from a proposed smoothing operation exceeds distortion_max, then the smoothing operation is not performed. Distortion constraints may be, for example, fixed or variable and may be based on various distortion metrics, such as, for example, spatial distance and/or mismatched edge pixels.

Although the above-described implementations principally apply the alignment vectors to frames, the described concepts also are applicable to implementations that apply local alignment vectors (or other transformations) corresponding to portions of a frame. For example, a frame may be divided into blocks, as discussed earlier, and the new alignment vector for a particular block may depend on the alignment vectors and new alignment vectors for neighboring blocks within the same frame.

As described above, implementations may determine new alignment vectors for, for example, one or more color components of a frame. A transformation for a reference separation also may be determined and used to provide increased temporal stability.

Additional Distortion Metrics

Distortion metrics may be used that address particular issues. One such issue is the possibility that an incorrect alignment vector, which produces a registration shift that is very different than the "true" optimal alignment vector, may result in a low distortion. A distortion metric that discounts such an incorrect alignment vector, so as to make the associated distortion value high and reduce the likelihood that the incorrect alignment vector is selected, may be beneficial.

Figure 9:
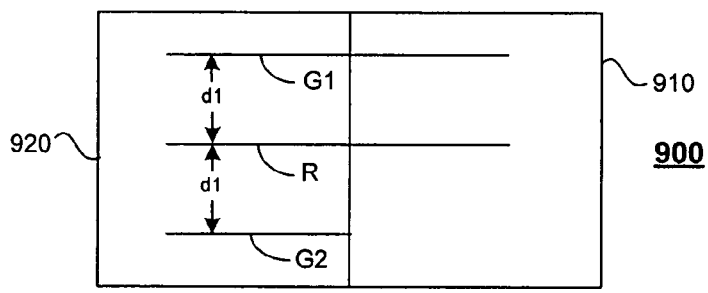
FIG. 9 is a diagram of a frame for illustrating a distortion calculation.

Referring to FIG. 9, a composite frame 900 includes a first block 910 and a second block 920. Block 920 includes three parallel lines: a top green line G1, a bottom green line G2, and a red line R that is equidistant between line G1 and line G2 at a distance "d1" from both lines G1 and G2. Lines G1 and G2 are isolated in the green separation and line R is isolated in the red separation. Considering block 920 alone, it is not clear whether line R corresponds to line G1 or to line G2. Accordingly, when the alignment vector for the red separation of block 920 is determined by considering only the current block 920, alignment vectors of "d1" and "−d1" will both presumably produce the minimum distortion. As block 910 indicates, however, line R corresponds to line G1, so that the true shift required for registration is an upward shift of line R, and the proposed alignment vector of "−d1" is a distance of "2*d1" away from the desired shift and may produce observable misregistration as well as temporal instability. Various solutions are possible that may discount the proposed alignment vector of "−d1." Two such solutions are to discount the proposed alignment vector if the alignment vector is too far away from (i) the best alignment vector determined thus far for the current block within the frame, or (ii) the best alignment vector determined for a neighboring block within the current frame. By comparing the alignment vector to the best alignment vector of a neighboring block, spatial continuity within the frame can be better preserved. In addition, because neighboring blocks likely have similar alignment vectors, information from a neighboring block can assist in the proper selection of the alignment vector of a current block. One particular implementation combines both solutions to produce an additional distortion term that is added to the distortion value otherwise computed for a given alignment vector, as described below.

In the implementation, the optimal alignment vector for a neighboring block within the current frame, V_n, is used as an initial candidate alignment vector for the current frame, and candidate alignment vectors, V_i(cand), having progressively larger distances from the initial candidate vector are considered. As candidate vectors are considered, the implementation keeps track of which candidate vector, V_i(opt), has produced the lowest distortion, D_i(opt). An additional non-linear distortion term, Dextra_i, is calculated for a candidate vector, V_i(cand), as follows:

$$\text{Dextra}\_i = 0, \text{ if absolute value}(V\_i(\text{cand}) - V\_i(\text{opt})) \leq C1 \text{ or if absolute value }(V\_i(\text{cand}) - V\_n) \leq \text{absolute value}(V\_i(\text{opt}) - V\_n), \text{ and}$$

$$\text{Dextra}\_i = C2 * D\_i(\text{opt}), \text{ otherwise,}$$

where C1 and C2 are positive constants.

Total distortion is the sum of the normal distortion, calculated according to the distortion metric being used (for example, a one-sided mismatch accumulator), and Dextra_i.

The above distortion algorithm can be applied to frame 900. Assume that the registration process has been applied to block 910 to produce an optimal alignment vector for block 910 of d1, and that the registration process is now being applied to neighboring block 920. V_i(opt) is initially set to V_n, which is d1, and which produces a minimum distortion, D_i(opt). Another vector that presumably produces the minimum distortion is −d1. Assuming that −d1 is considered as a candidate alignment vector, Dextra_i then is computed for the candidate alignment vector of −d1. Assuming that D_i(opt) is not zero and that 2*d1>C1, then Dextra_i will be positive. Thus, the candidate alignment vector of −d1 will be discounted by the additional distortion of Dextra_i and will not be selected as V_i(opt).

Using the above algorithm for determining when to compute and use Dextra_i, candidate alignment vectors are not discounted if those vectors are near the currently-optimal vector or near the neighboring block's optimal vector. As indicated above, this algorithm may provide advantages even if the minimum distortion is not achieved. Additionally, this algorithm may be adapted for use with systems that do not necessarily select the optimal vector or the minimum distortion.

Figure 10:
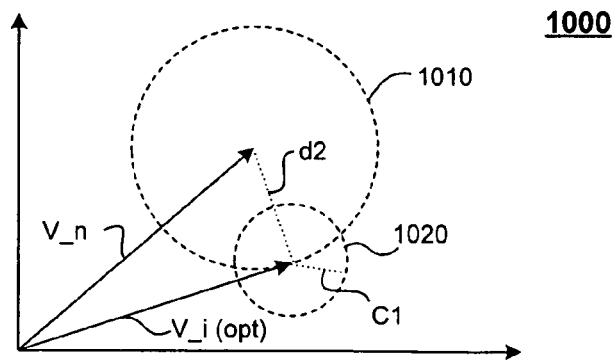
FIG. 10 is a graph illustrating another distance distortion metric.

Referring to FIG. 10, a graph 1000 shows a two-dimensional example illustrating the distances used in the above equation for Dextra_i. V_i(opt) initially is set to V_n, and graph 1000 shows the scenario after other candidate vectors have been considered and a new V_i(opt) has been determined. The new V_i(opt) and V_n are separated by a distance d2, and the distance d2 defines a circle 1010 around V_n. Any future candidate alignment vectors that are within circle 1010, and that are considered before another V_i(opt) is determined, will not be discounted. A circle 1020 is defined around V_i(opt) having a radius of C1, and any future candidate alignment vectors that are within circle 1020, and that are considered before another V_i(opt) is determined, also will not be discounted. Both circles 1010 and 1020 may change if a new candidate alignment vector becomes V_i(opt), with circle 1010 possibly changing in radius and circle 1020 changing its center point.

Note that an alternate solution is to discount the proposed alignment vector if the alignment vector is too far away from the best alignment vector determined for the corresponding block within the previous frame. Such a solution may be considered to be an extension of the temporal implementations described previously.

The various distortion metrics discussed herein may be applied to transformations other than alignment vectors. For example, distortion metrics relying on spatial distance may be generalized as relying on the magnitude of the transformation. Accordingly, distance metrics may be applied to other transformations by replacing the distance with the magnitude of some characteristic of the transformation, such as, for example, the magnitude of a rotation or a scaling in an affine transformation.

Composite Color Images

Figure 11:
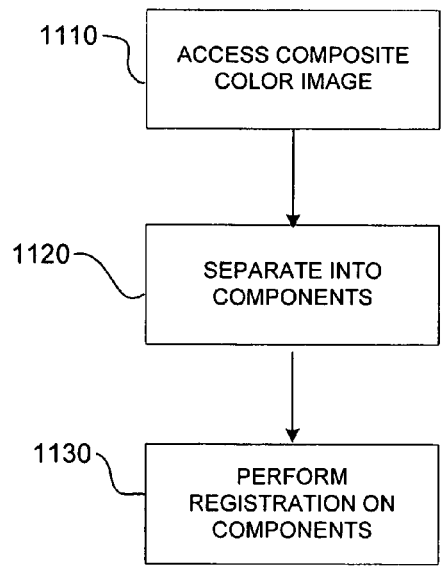
FIG. 11 illustrates a process for registering composite color images.

Referring to FIG. 11, a process 1100 shows that the implementations and techniques described herein also may be applied to composite color images, that is, images that have more than one color component. In general, the color composite image may be accessed (1110) and processed (1120) to separate out various components, and one or more of the registration implementations and techniques described herein may be applied to the components (1130).

The individual components that are separated out from the color composite image may relate, for example, to a single color, to multiple colors, or to luminance (brightness).

Composite color images may have been formed by, for example, combining film separations to produce a composite RGB or YCM image. The composite RGB or YCM image may be processed to separate the color components and then a registration algorithm may be applied to the separated color components, and the registered components may be combined again to form a new composite color image.

As another example, film separations may have been combined through some other mechanism (such as a photographic process currently performed in film labs by movie studios) and the combination may have been subsequently converted to some other format, such as, for example, video. The video may use, for example, a YUV format in which Y represents the luminance, and U and V represent the chrominance (color). In one implementation, video in YUV format is input, the YUV input is converted into separated R, G, and B color components using a mathematical conversion, and the separated RGB color components are registered using one of the registration algorithms described herein. The registered RGB components may be, for example, combined into a composite RGB image, or converted back to YUV so that the YUV components may be combined into a composite video image.

The ability to perform registration on a composite color image may be beneficial, for example, when the original reels of film corresponding to a movie property are no longer available. For example, the movie property may only be available in another format, such as a production video master. The ability to perform such registration also may be beneficial when the cost associated with restoring the film from its original YCM separations is too high. For example, the original YCM separations may have been extensively processed to produce a production video master, such as, for example, by performing color correction and other processes, including restorative processes. By using the production video master, the improvements from the processing already performed may be retained. Because the disclosed registration algorithms are able to use input that has been preprocessed and/or converted from different formats, many types of media may be processed with the disclosed registration algorithms.

The implementations and techniques described herein also may be applied to successive YCM, in which the Y, C, and M components are printed successively for each frame on the same reel of black and white film. Misregistration among these components may occur, for example, for one of the reasons discussed earlier (e.g., film shrinkage).

After one or more component images have been registered, the resulting component images, and a composite image based on the component images, may be stored on a DVD or other storage device. The registered component image(s) and the composite image are each said to have been transformed or registered. Further, a composite image also may be based on a transformation of the component images, as may happen, for example, if (i) a set of component images in an RGB format are registered, (ii) the registered RGB component images are converted into another format, such as YUV, and (iii) the YUV component images are formed into a composite image. In the above example, the YUV composite image, and the YUV component images, also are said to have been transformed or registered, albeit indirectly, by being based on the registered RGB component images.

The component images may be separate from each other or, for example, interleaved with each other. Interleaving may be performed, for example, for each pixel, or for a block of pixels.

Additionally, the component images may be encoded using, for example, an MPEG-2 standard, and the encoded component images may be stored or transmitted. In order to display the original image, the encoded data may be decoded to generate the component images, or varied instances of the component images due to lossy compression, and the component images may be combined to form a composite image. The generated component images, even if varied due to losses in compression, are still considered to have been transformed to reduce misregistration, even though the generated component images have had some additional compression-related distortion introduced Additional Implementations Although the concepts and features that have been described typically involve a reference image that undergoes no alignment or other transformation, these concepts and features could be applied to implementations in which all images undergo alignment changes or other transformations. For example, there may be temporal misalignment between consecutive reference frames. To reduce the misalignment, an alignment vector or some other transformation may be determined for a current reference frame based on a previous reference frame, and the determined vector/transformation may be applied to the current reference frame. Thereafter, the registration algorithm may be applied between the current non-reference frames and the newly aligned/transformed reference frame.

Additionally, one or more of the algorithms that have been described may be repeated after an alignment or other transformation has been determined and applied. The repeated algorithm may be applied to the aligned/transformed image or to the original image in an effort, for example, to provide a better-registered resulting image. For example, after aligning/transforming an image, the high intensity selection procedure may be performed based on the aligned/transformed image to determine if new bright edge result from the alignment/transformation.

The implementations and techniques described above can be applied to a variety of applications in which multiple separations need to be registered. Examples include spectral and non-spectral separations. Spectral separations are used, for example, in: (1) color film applications capturing, for example, different color frequencies, (2) astronomical applications capturing, for example, radio frequencies and/or optical frequencies, and (3) medical applications capturing, for example, different magnetic (MRI), X-ray, and sound (ultrasound) frequencies. As the last example illustrates, spectral separations may be captured from various frequency sources, including, for example, electromagnetic and sound waves. Non-spectral separations may be obtained from, for example, variations in pressure, temperature, energy, or power.

A number of implementations have been described. Nevertheless, it will be understood that various modifications may be made without departing from the spirit and scope of the claims. For example, the implementations and features described may be implemented in a process, a device, a combination of devices employing a process, or in a computer readable medium or storage device (for example, a floppy disk, a hard disk, RAM, ROM, firmware, electromagnetic waves encoding or transmitting instructions, or some combination) embodying instructions for such a process.

One such device is, for example, a computer including a programmable device (for example, a processor, programmable logic device, application specific integrated circuit, controller chip, ROM, or RAM) with appropriate programmed instructions and, if needed, a storage device (for example, an external or internal hard disk, a floppy disk, a CD, a DVD, a cassette, a tape, ROM, or RAM). The computer may include, for example, one or more general-purpose computers (for example, personal computers), one or more special-purpose computers (for example, devices specifically programmed to communicate with each other), or some combination.

The implementations described, or variations of the implementations, may produce a modified image or series of images, such as, for example, an entire movie that has been modified to reduce one or more distortions, such as, for example, misregistration. The modified image(s) may be stored, permanently or temporarily, on a storage device, computer readable medium, or programmable device. Storage devices may be, for example, analog devices, digital devices, or a combination of analog and digital. Storage devices may include, for example, a reel, a VHS tape, a video, an optical disc (including, for example, a DVD), and the other examples of storage devices listed earlier.

The use of headers and sections on this document is intended for ease of referencing the disclosure contained in the document, and is not intended to limit the applicability or relevance of material discussed in any given section. To the contrary, the material discussed in each section may be relevant to discussions in other sections, and the use of headers and sections does not restrict the application of the material to the other sections. In particular, material from one section may be combined with the material from any and all of the other sections.

Accordingly, other implementations are within the scope of the following claims.

What is claimed is:

1. An apparatus having stored thereon at least the following:
   information relating to an image in a sequence of images, the information configured to allow generation of a first component image of the image and a second component image of the image, the first and second component images including first and second content, respectively, relating to a specific portion of the image,
   wherein:
      the second component image has been transformed to reduce misregistration between the first and second component images as compared to misregistration between the first component image and a prior version of the second component image, the transformation having been based on registration information from another image in the sequence of images,
      the first component image comprises a first color separation,
      the second component image comprises a second color separation, and
      displays of the first color separation and the second color separation are configured to collectively form at least part of a single resultant image.

2. The apparatus of claim 1 wherein the second component image comprises analog information.

3. The apparatus of claim 1 wherein the second component image comprises digital information.

4. The apparatus of claim 1 wherein the first color separation is a digital color separation.

5. The apparatus of claim 1 wherein the second component image is part of a frame in a film.

6. The apparatus of claim 1 wherein the apparatus comprises a reel.

7. The apparatus of claim 1 wherein the apparatus comprises a video.

8. The apparatus of claim 1 wherein the apparatus comprises an optical disc.

9. The apparatus of claim 1 wherein the apparatus comprises a computer readable medium.

10. The apparatus of claim 1 wherein the second component image has been indirectly transformed by being based on one or more images that have been directly transformed.

11. The apparatus of claim 10 wherein:
   the second component image is one of a set of corresponding images stored in a YUV format,
   the set of corresponding images, including the second component image, is based on another set of corresponding images having an RGB format, and
   one or more of the other set of corresponding images has been directly transformed to reduce misregistration between two or more images of the other set of corresponding images, whereby the second component image is indirectly transformed by being based on the one or more images that have been directly transformed.

12. The apparatus of claim 1 wherein the information includes encoded information configured to be decoded to generate the first and second component images.

13. The apparatus of claim 12 wherein the first and second component images are interleaved with each other.

14. A method of generating component images comprising:
   accessing information relating to an image in a sequence of images; and
   generating a first component image of the image and a second component image of the image based on the accessed information, the first and second component images including first and second content, respectively, relating to a specific portion of the image,
   wherein:
      the second component image has been transformed to reduce misregistration between the first and second component images as compared to misregistration between the first component image and a prior version of the second component image, the transformation having been based on registration information from another image in the sequence of images,
      the first component image comprises a first color separation,
      the second component image comprises a second color separation, and
      displays of the first color separation and the second color separation are configured to collectively form at least part of a single resultant image.

15. The method of claim 14 wherein the first color separation is a digital color separation.

16. The method of claim 14 wherein the second component image has been indirectly transformed by being based on one or more images that have been directly transformed.

17. The method of claim 16 wherein:
the second component image is one of a set of corresponding images stored in a YUV format,
the set of corresponding images, including the second component image, is based on another set of corresponding images having an RGB format, and
one or more of the other set of corresponding images has been directly transformed to reduce misregistration between two or more images of the other set of corresponding images, whereby the second component image is indirectly transformed by being based on the one or more images that have been directly transformed.

18. The method of claim 14 wherein the information includes encoded information configured to be decoded to generate the first and second component images.

19. The method of claim 18 wherein the first and second component images are interleaved with each other.

20. A system comprising:
means for accessing information relating to an image in a sequence of images; and
means for generating a first component image of the image and a second component image of the image based on the accessed information, the first and second component images including first and second content, respectively, relating to a specific portion of the image,
wherein:
the second component image has been transformed to reduce misregistration between the first and second component images as compared to misregistration between the first component image and a prior version of the second component image, the transformation having been based on registration information from another image in the sequence of images,
the first component image comprises a first color separation,
the second component image comprises a second color separation, and
displays of the first color separation and the second color separation are configured to collectively form at least part of a single resultant image.

* * * * *